(12) United States Patent
Ciferri et al.

(10) Patent No.: US 6,695,382 B2
(45) Date of Patent: Feb. 24, 2004

(54) CONTAINER COVERING SYSTEM

(75) Inventors: Michael F. Ciferri, Palm City, FL (US); Scot A. Fuhrman, Palm City, FL (US); Richard J. Coughtry, LaGrange, GA (US); Steven L. Growcock, Stuart, FL (US); Thomas J. Ahlstrom, Stuart, FL (US)

(73) Assignee: John Donovan Enterprises, Inc., Stuart, FL (US)

( * ) Notice: Subject to any disclaimer, the term of this patent is extended or adjusted under 35 U.S.C. 154(b) by 0 days.

(21) Appl. No.: 10/120,841

(22) Filed: Apr. 12, 2002

(65) Prior Publication Data

US 2003/0193208 A1 Oct. 16, 2003

(51) Int. Cl.$^7$ .................................................. B60P 7/04
(52) U.S. Cl. ..................................... 296/98; 296/100.14
(58) Field of Search ............................... 296/98, 100.14

(56) References Cited

U.S. PATENT DOCUMENTS

| | | |
|---|---|---|
| 4,050,734 A | 9/1977 | Richard |
| 4,095,840 A | 6/1978 | Woodard |
| 4,341,416 A | 7/1982 | Richard |
| 4,874,196 A | 10/1989 | Goldstein et al. |
| 5,031,955 A | 7/1991 | Searfoss |
| 5,238,287 A | 8/1993 | Haddad, Jr. |
| 5,292,169 A | 3/1994 | O'Brian |
| 5,340,187 A | 8/1994 | Haddad, Jr. |
| 5,752,735 A | 5/1998 | Fleming et al. |
| 5,829,818 A | 11/1998 | O'Daniel |
| RE36,135 E | 3/1999 | O'Brian |
| 5,887,937 A | 3/1999 | Searfoss |
| 5,944,374 A | 8/1999 | Searfoss |
| 6,070,313 A | 6/2000 | O'Brian |
| 6,109,680 A | 8/2000 | Horner et al. |
| 6,237,985 B1 | 5/2001 | O'Brian |
| 6,257,646 B1 | 7/2001 | Searfoss |
| 6,338,521 B1 | 1/2002 | Henning |
| 2002/0033615 A1 | 3/2002 | Henning |

*Primary Examiner*—Joseph D. Pape
(74) *Attorney, Agent, or Firm*—Banner & Witcoff, Ltd.

(57) ABSTRACT

A container covering system for open truck containers provides enhanced control and maneuverability of a tarp for covering containers of different sizes. A tarp can be extended and retracted under rotary movements of elements of the system to adapt for different lengths of containers. A tarp device includes the tarp, which can move between a stowed position and an extended position to cover the top of an open container. A pair of forward arms are pivotable with respect to a first pivot axis defined on the device. A pair of rear arms are pivotable respect to second pivot axis that is defined on the rear ends of the forward arms. A cross member extends between the end of the rear arms which are opposed to the second pivot axis. The cross member retains the leading end of the tarp and is movable with the rear arms. The rear arms are biased to rotate towards the rear end of the container. A biasing member is configured to rotate the rear arms around the second pivot axis. A torque generating device applies a resistive force on the tarp against the rotational bias of the rear arms to retract the leading edge of the tarp.

37 Claims, 15 Drawing Sheets

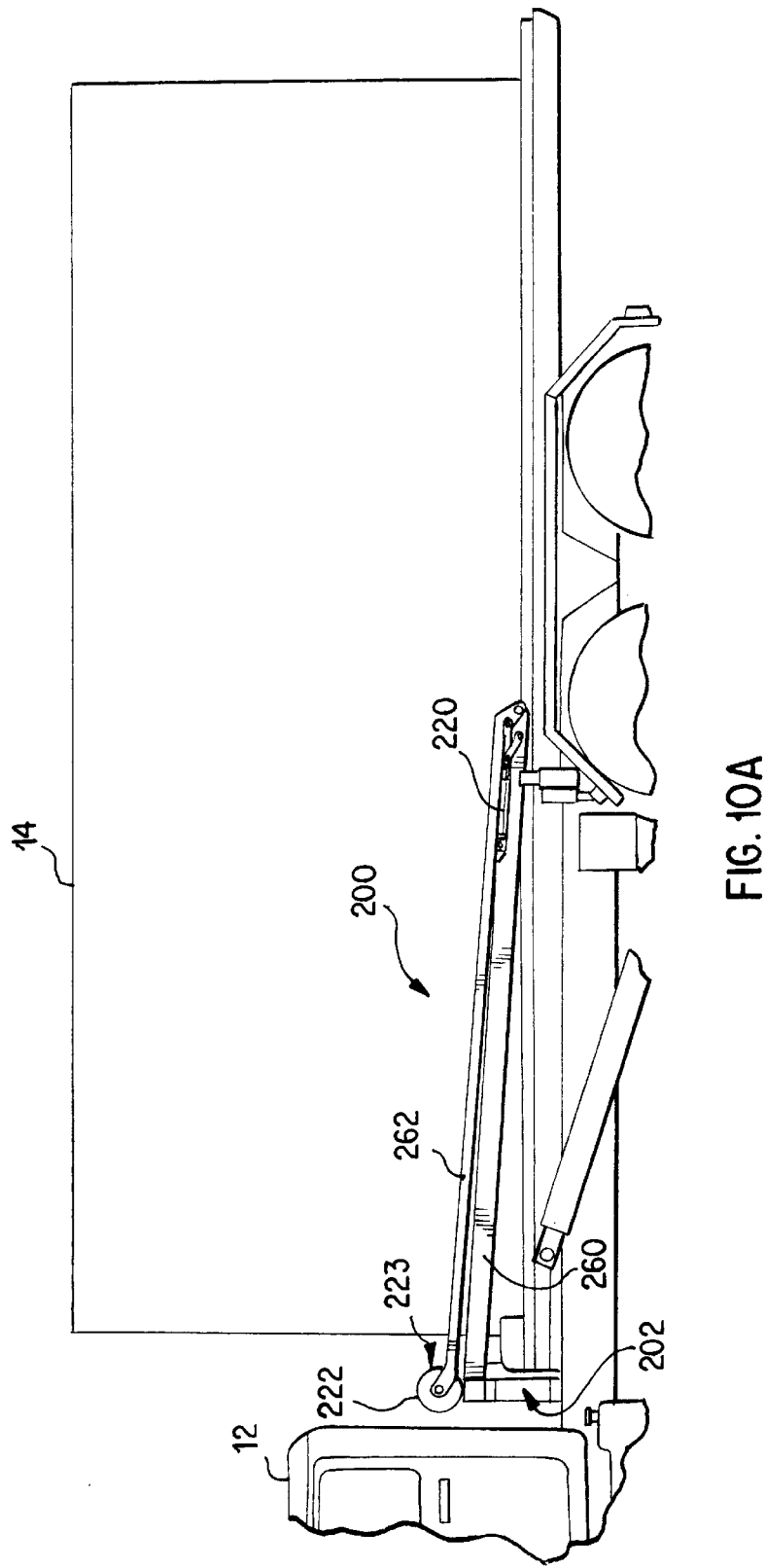

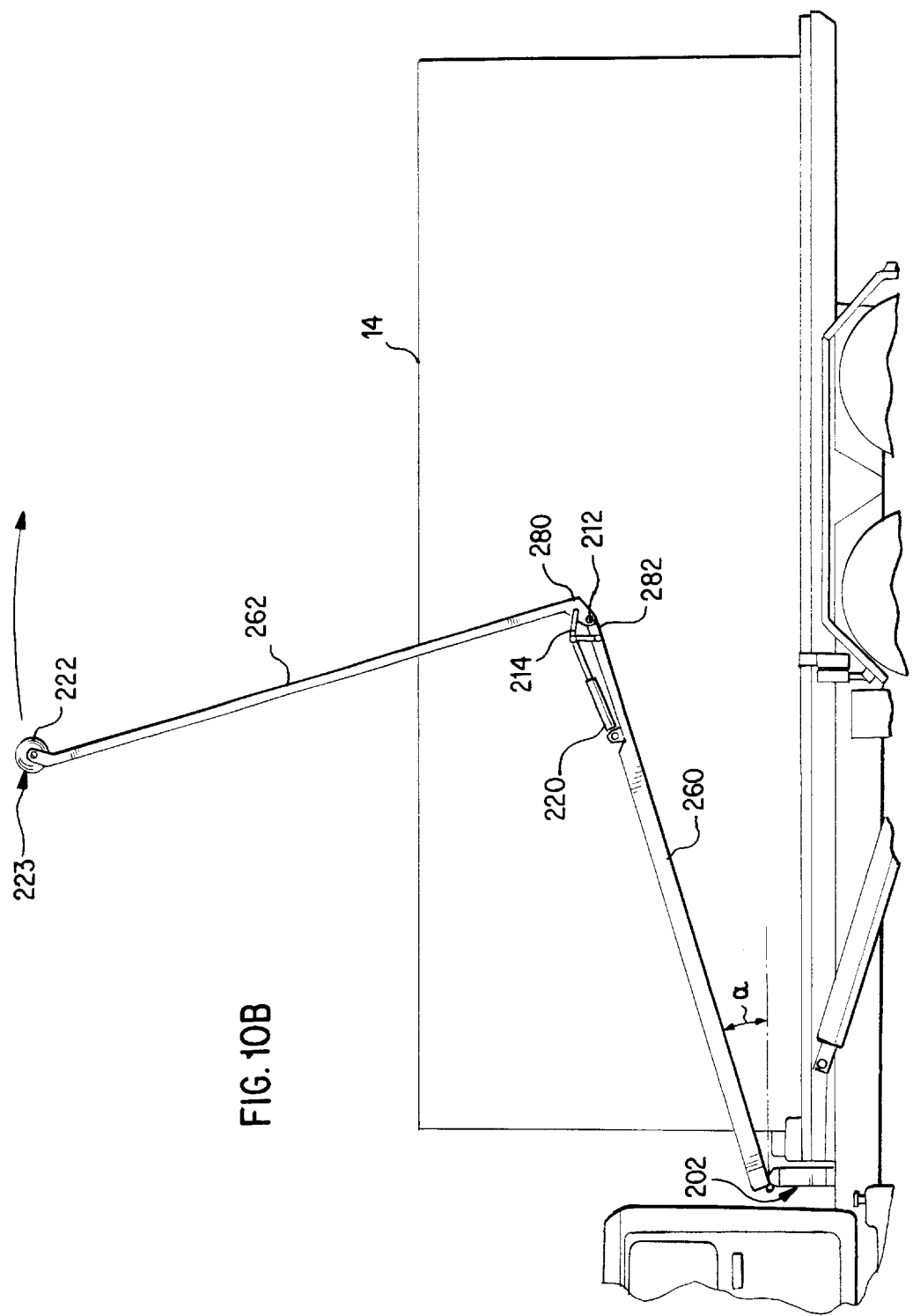

CONTAINER COVERING SYSTEM

FIELD OF THE INVENTION

The present invention pertains to a covering system for truck containers.

BACKGROUND OF THE INVENTION

The construction and sanitation industries utilize trucks to haul open containers that transport loose materials. The open top containers are frequently provided with a fabric or a tarpaulin which covers the load being transported in order to either protect the load or prevent parts of the load from being blown out of the container.

Open top containers are ordinarily formed as separable units that can be secured to the frame of a truck for transport and then removed from the truck for use at a desired site. These containers are typically used with so-called roll-off trucks. Open top containers can be used, for example, to receive and contain trash at a construction site. The containers are generally only loaded onto a truck for transport. The containers have a generally rectangular box shape, but vary in loading capacity from 10 cubic yards to 50 cubic yards. The containers vary widely in both length and height, with the sidewalls generally ranging from 4–8 feet in height and 10'–35' in length. Most containers in use today are 4', 6' or 8' high and 17–24 feet long. Still some containers in use have a rear wall higher than the rest of the container.

U.S. Pat. No. 5,031,955 issued to Searfoss illustrates a truck covering system for a fixed dump body. Arms located laterally of the dump body are connected to a tarpaulin to selectively cover the open top of the dump body. This covering system is not designed for trucks that carry interchangeable open top containers of different lengths and heights. Further, these systems use arms with a fixed swinging stroke or arms with telescoping segments. A system with a fixed stroke cannot accommodate different sized containers and may experience difficulty in covering loads that project above the top edges of the container, especially at the front or rear of the container. While telescoping arms provide some adjustment of the swinging stroke, they require manual adjustment, are susceptible to being bent and rendered non-adjustable even if bent only a little, and require a higher level of maintenance to keep the telescoping segments cleaned and operable.

Past covering systems for roll-off trucks have generally relied upon a tarpaulin which extends over the top opening of the container and retracts to a stowed position. While the past systems help to cover the load for transportation, the arrangements that move the tarpaulin have suffered from a variety of drawbacks. In one case, U.S. Pat. No. 5,340,187 issued to Haddad describes a truck covering system with telescoping arms. Although the telescopic arms accommodate variations in the lengths of the containers, they, as noted above, require high maintenance and are susceptible to being damaged and rendered inoperable.

In other examples, U.S. Pat. No. 5,829,818 to O'Daniel and U.S. Pat. No. Re 36,135 to O'Brian describe truck container covering systems wherein the arms are pivotally secured at a midsection of the truck bed so as to swing about a transverse axis and cover or uncover the container. However, during loading and unloading of the container on the truck, the container can slide laterally and strike against and damage the arms and/or pivot connection. The fixed connection of the arms to the bed provides no flexibility and is thus susceptible to being broken by such contact. Moreover, heavy materials dumped into open containers sometimes cause the sidewalls to bow outward. This fixed pivot arrangement of the arms at a midsection of the truck bed may not accommodate the increased width of the container as it is loaded onto the truck.

During transportation of the containers, the arms are subjected to dynamic loads from rough road surfaces. As a result, when the tarp is stretched across the rear end of the container, the arms may bounce upward and release some of the load inside the container. None the above covering systems adequately address this problem.

SUMMARY OF THE INVENTION

The present invention pertains to a container covering system for open top containers provided with enhanced control and maneuverability for covering containers of different sizes without high risk of damage and/or high maintenance requirement of past systems.

In accordance with one aspect of the present invention, a tarp is extended and retracted by an articulated arm assembly provided along each side of the truck bed. Each arm assembly includes a first arm that is secured at a front location of the truck bed, and a second arm that is pivotally secured to the rear end of the front arm. In this way, the fixed connection of the arms to the truck bed is located at a forward location where it is less likely to be struck by a wayward container being loaded or unloaded from the bed. The rearward extension of the arms possesses a certain amount of flexibility to accommodate some contact between the arms and the container without damaging the covering system.

In accordance with another aspect of the invention, the first arms are pivotally secured to the truck for enhanced adjustability in covering various size containers as well as retracting. The pivotal movement of the first arms is controlled by at least one actuator that is able to swing the arms upward or downward as needed in covering or uncovering the container. Moreover, in one preferred construction, the arms are secured to a vertically adjustable tower to further enhance its capacity to cover containers of varying heights and any projecting or heaped loads in the containers.

In one embodiment of the invention, the second arms are operatively coupled to the tarp and are constantly biased to swing toward the rear end of the container to naturally extend the tarp over the container. The arms are, however, held in place until the tarp device is actuated to play out or retract the tarp. More specifically, the tarp is extended by rotating the roller bar of the tarp device holding the stowed tarp. In this way, the bias of the second arms in cooperation with the operation of the tarp device maintains the tarp under tension and extends the tarp over the container in a smooth and uniform manner. Moreover, the use of the springs eliminates the need for the arm assemblies to support hydraulic cylinders and thus reduces the weight and the stress on the arms.

In another aspect of the invention, the arms are preferably composed of a material having a high strength to weight ratio. In one embodiment, the material can be a fiber reinforced composite. In this way, the stress and fatigue on the components of the system are reduced so as to extend the operational life of the system.

In a further aspect of the invention, the rear arms have a flexible portion disposed along a predefined length of the arms so as to provide a further adjustment for moving the leading end of the tarp to the extended position and a shock absorption means to reduce stress on the arms.

The above and other aspects, features and advantages of the present invention will be readily apparent and fully understood from the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 10A is a schematic side elevational view of an alternative embodiment of a container covering system according to teaching of the present invention in a stowage position.

FIG. 10B is a schematic side elevational view of an alternative embodiment of a container covering system according to teaching of the present invention in an intermediate operational position.

FIG. 11 is a schematic side elevational view of a pivoting arrangement of an alternative embodiment of the present invention.

DETAILED DESCRIPTION OF THE PREFERRED EMBODIMENTS

Figure 4A:
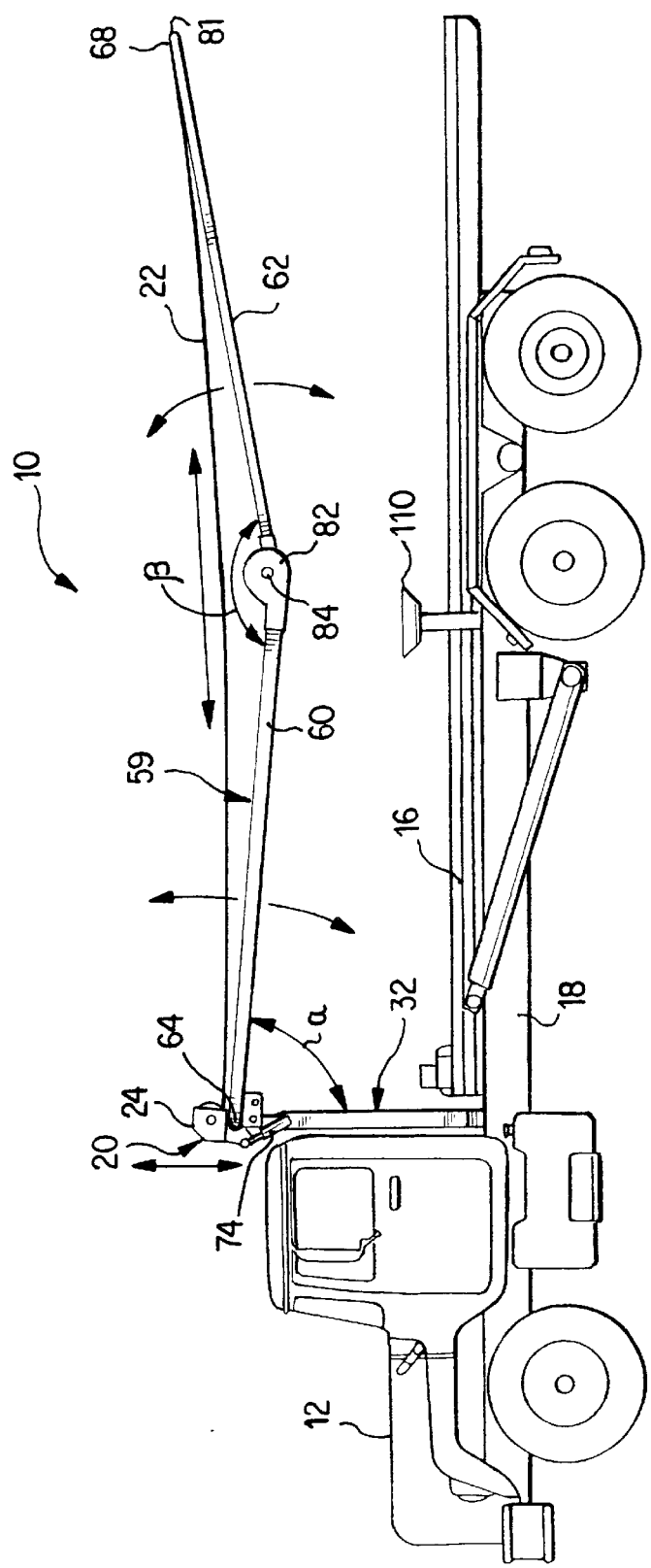
FIG. 4A is a schematic side elevational view of the container covering system illustrating the range of movements of various operative components.

In one preferred embodiment of the invention, a container covering system 10 is mounted on a truck 12 adapted to support and haul an open top container 14 (FIG. 4A). As referred to herein, for ease of explanation, the container 14 is referred to as container or container body. The open top container 14 is generally supported on a tiltable receiving frame 16 so as to be loaded and unloaded from the truck, although other trucks are possible. While the covering systems of the present invention are intended for use with such roll-off trucks, they could also be used in conjunction with a wide variety of trucks including those with permanent containers, if desired.

Figure 1:
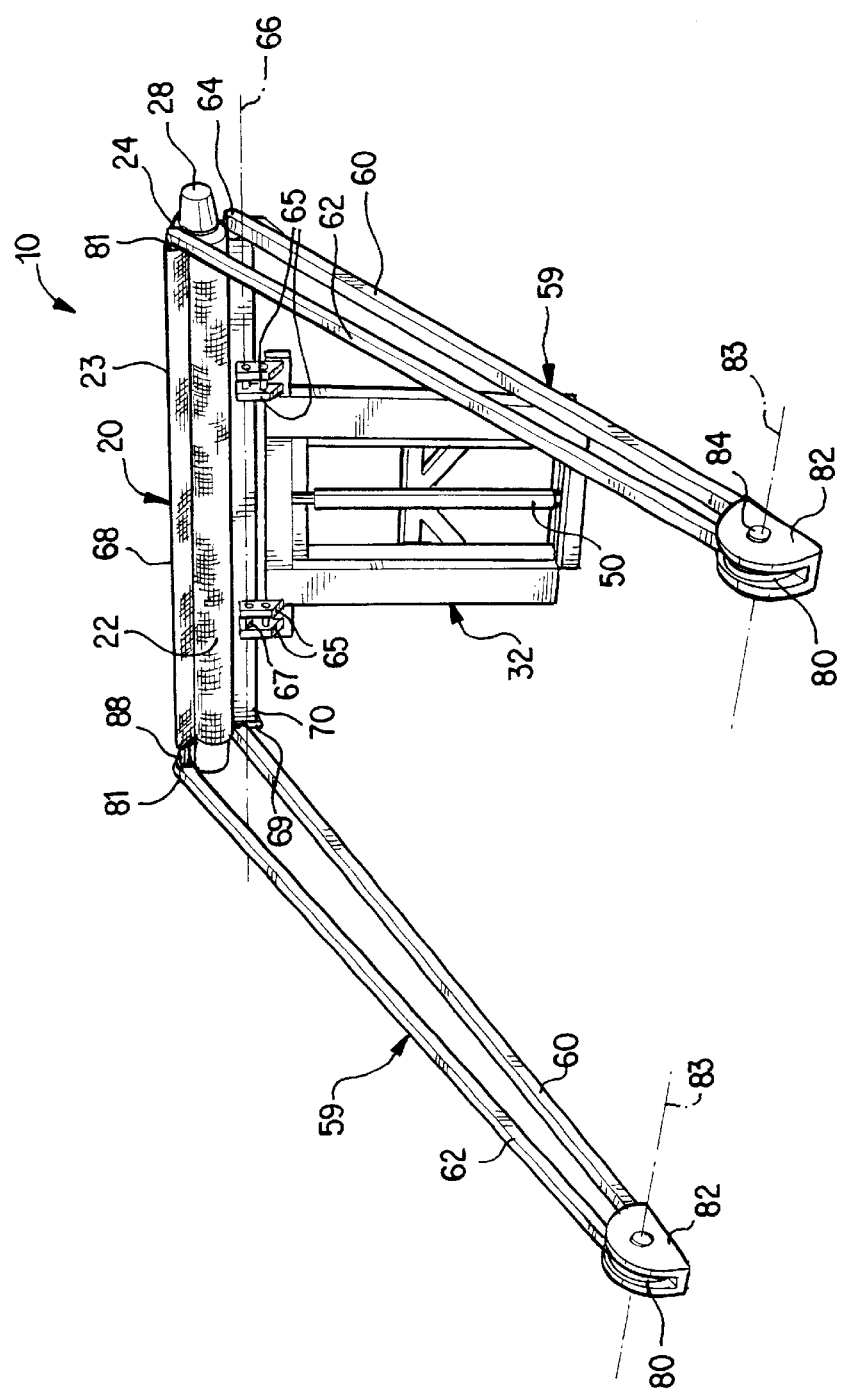
FIG. 1 is a schematic rearward perspective view of an embodiment of a container covering system according to the teachings of the present invention.
Figure 4B:
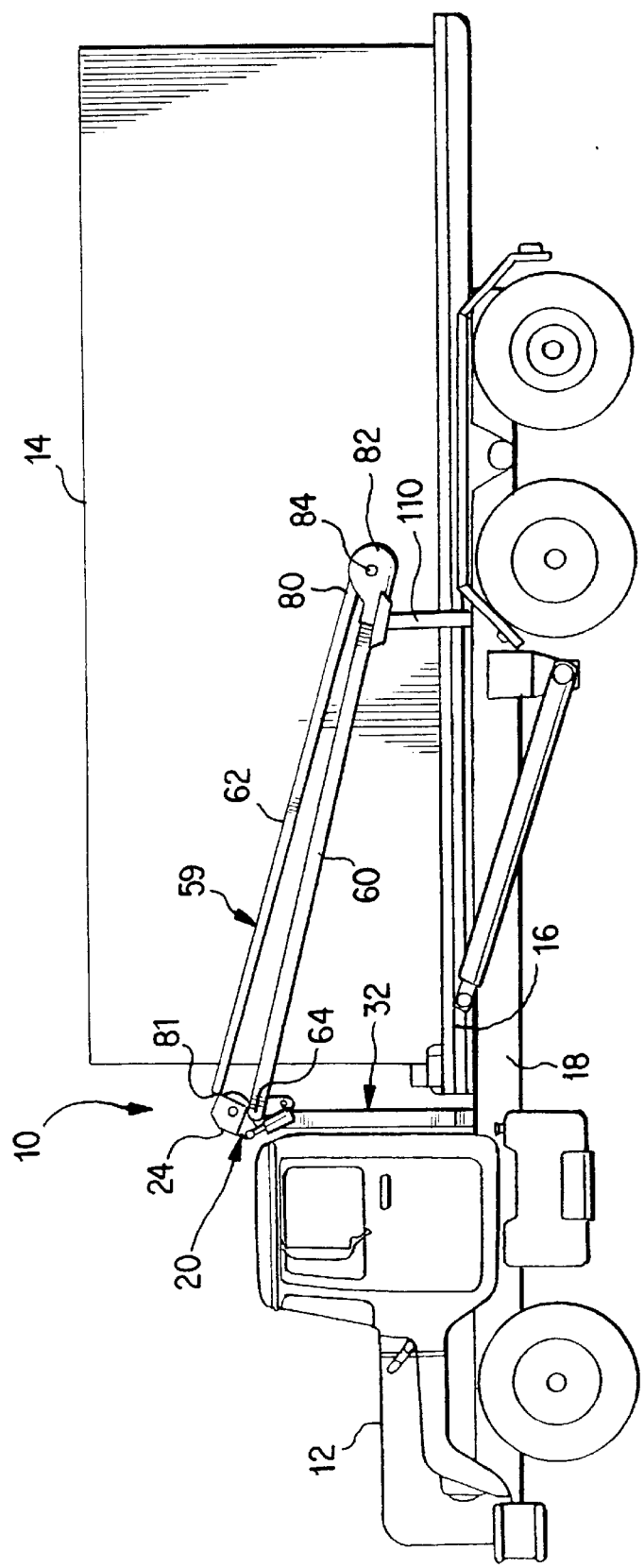
FIG. 4B is a schematic side elevational view of the embodiment of a container covering system according to the teachings of the present invention installed on a truck.

Referring to FIGS. 1, 4A and 4B, covering system 10 includes an articulated arm assembly 59 on each side of the truck bed that includes a first arm 60 and a second arm 62. As described below, for ease of explanation, the first arms are referred to as front or lower arms 60 and the second arms are referred to as rear or upper arms 62. Front arms 60 are secured to a front portion of the truck bed so as to reduce the risk of contact with the container when it is loaded or unloaded from the truck bed, and also to avoid the formation of a fixed width dimension at a midsection of the truck bed which may inhibit some containers bowed from use from being loaded onto the truck. The front arms are preferably attached for pivotal movement, although they could be fixably attached if some reduced adjustability is deemed acceptable for the intended use. In the preferred construction, the front arms 60 are pivotally secured at their front ends to an upper portion of a tower 20. The upper or rear arms 62 are pivotally secured at their proximal ends to the rear ends of the front arms. The distal ends of the rear arms 62 are preferably connected to each other via a cross member 88. Cross member 88 is operatively coupled to the tarp 22 for covering and uncovering the container. Arms 60, 62 and cross member 88 are preferably formed as hollow rods having virtually any cross-sectional shape, but could be solid as well.

Referring to FIGS. 1, 2A–B and 3, container covering system 10 includes a tarp device 23 that retains a flexible sheet material used to cover container 14. This sheet material is referred to as a tarp herein and is intended to mean any of the known flexible sheet materials to cover truck containers. The tarp device 23 is preferably mounted on a tower 20, which is preferably configured to move vertically for controlled placement of the tarp 22 over or under the top edge of the container; although a fixed tower or support can be used. The upper portion of tower 20 preferably supports a housing 24 of tarp device 23. The tarp 22 is provided on a roller bar 26 (see FIG. 2B), which is rotatably mounted in the housing 24. A tarp motor 28, mounted to the housing 24, includes a drive rod (not shown) configured to reliably rotate the roller bar 26 so that the tarp smoothly and uniformly unfurls to an extended position to cover the open top container 14. Likewise, the tarp motor 28 also rewinds the tarp on the roller bar to a retracted position where the tarp is substantially stowed within the housing 24. In a preferred construction, the tarp motor 28 may be an electric direct drive type used in tarp devices. Nevertheless, other devices, such as a hand crank, could be used instead of a tarp motor. It should be appreciated that housing 24 may be constructed from a variety of materials, such as steel, aluminum, or a durable plastic material.

As shown in FIGS. 4A and 4B, tower 20 is preferably mounted on a forward portion of the truck bed, behind the truck cab. The tower 10 may be attached to the receiving frame 16, truck frame 18 or other part of the vehicle. In a preferred construction, best seen in FIG. 3, tower 20 includes a lifting device 32 composed of three telescoping subunits 34, 36, 38 that lift the housing 24 vertically above the container 14 or lower the housing 24 below the top edge of the container. Of course, other constructions involving telescoping and non-telescoping arrangements could be used to lift the housing 24, or the housing could be supported at a fixed height.

Figure 3:
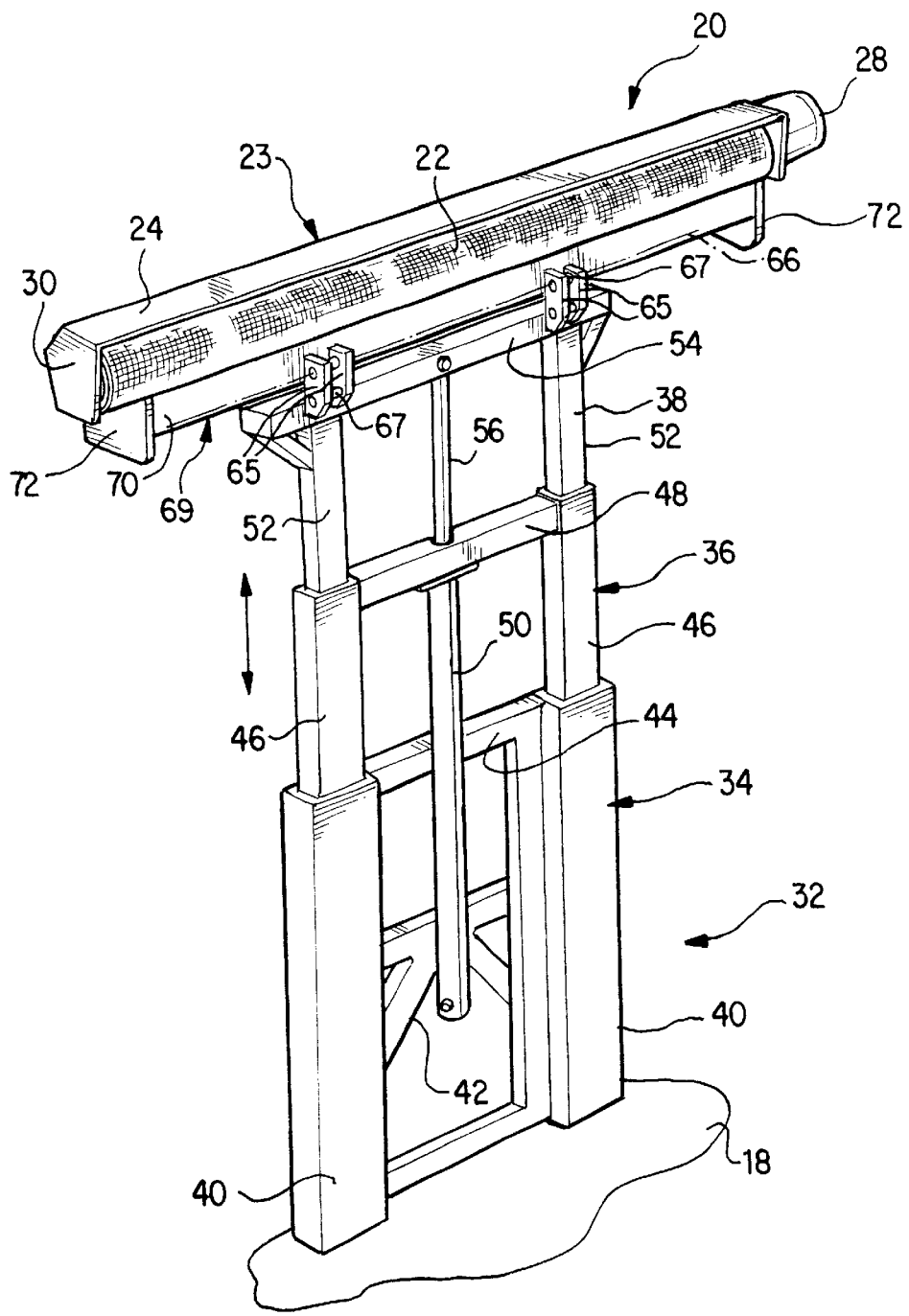
FIG. 3 is a schematic rearward perspective view of an embodiment of a container covering system according to the teaching of the present invention with arm assemblies removed to illustrate other components of the system.

Referring to FIG. 3, the lower subunit 34 includes a pair of hollow stanchions 40 which extend upward from a base (not shown). The stanchions preferably have a square cross section though other shapes could be used. The base is adapted to be fixedly secured, e.g., by bolting or other means, to frame 18 of the truck. A lower support assembly 42 and an upper cross support 44 extend between stanchions 40 to stabilize tower 20.

Medial subunit 36 has a generally rectangular configuration composed of a pair of hollow, vertical posts 46 which are matingly received into the open upper ends of stanchions 40. The posts 46 are interconnected by a cross rail 48 for support and stability of the subunit. The cylinder 50 of a hydraulic unit (not shown) is also secured to cross rail 48. While the use of a hydraulic piston and cylinder unit is preferred, other lifting elements could be used.

Upper subunit 38 has a similar construction with a pair of vertical legs 52 matingly received within the open upper ends of posts 46, and an upper mount 54 interconnecting the two legs. Mount 54 is a horizontal member to which the housing 24 is pivotally mounted as described more fully described below. A piston rod 56 extends out of cylinder 50 and attaches to mount 54 to raise and lower upper subunit 38. The lifting device 32 is essentially the same as described in U.S. Pat. No. 6,109,680 issued to Horner et al. on Aug. 29, 2000, which is hereby fully incorporated by reference; although the ultimate height of the lifting device may be substantially less when used in conjunction with this invention than in the noted U.S. Patent.

Figure 2A:
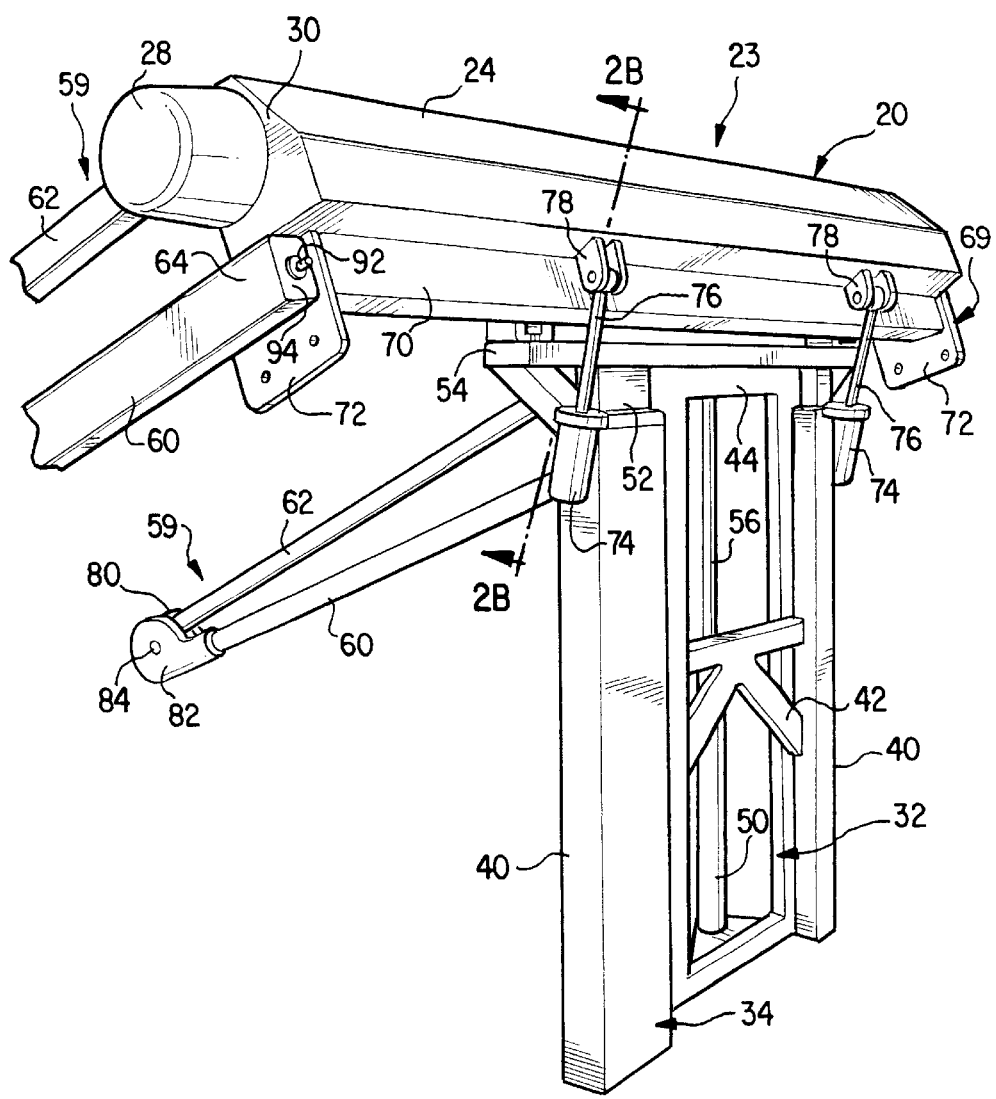
FIG. 2A is a schematic forward perspective view of an embodiment of a container covering system according to the teachings of the present invention.
Figure 2B:
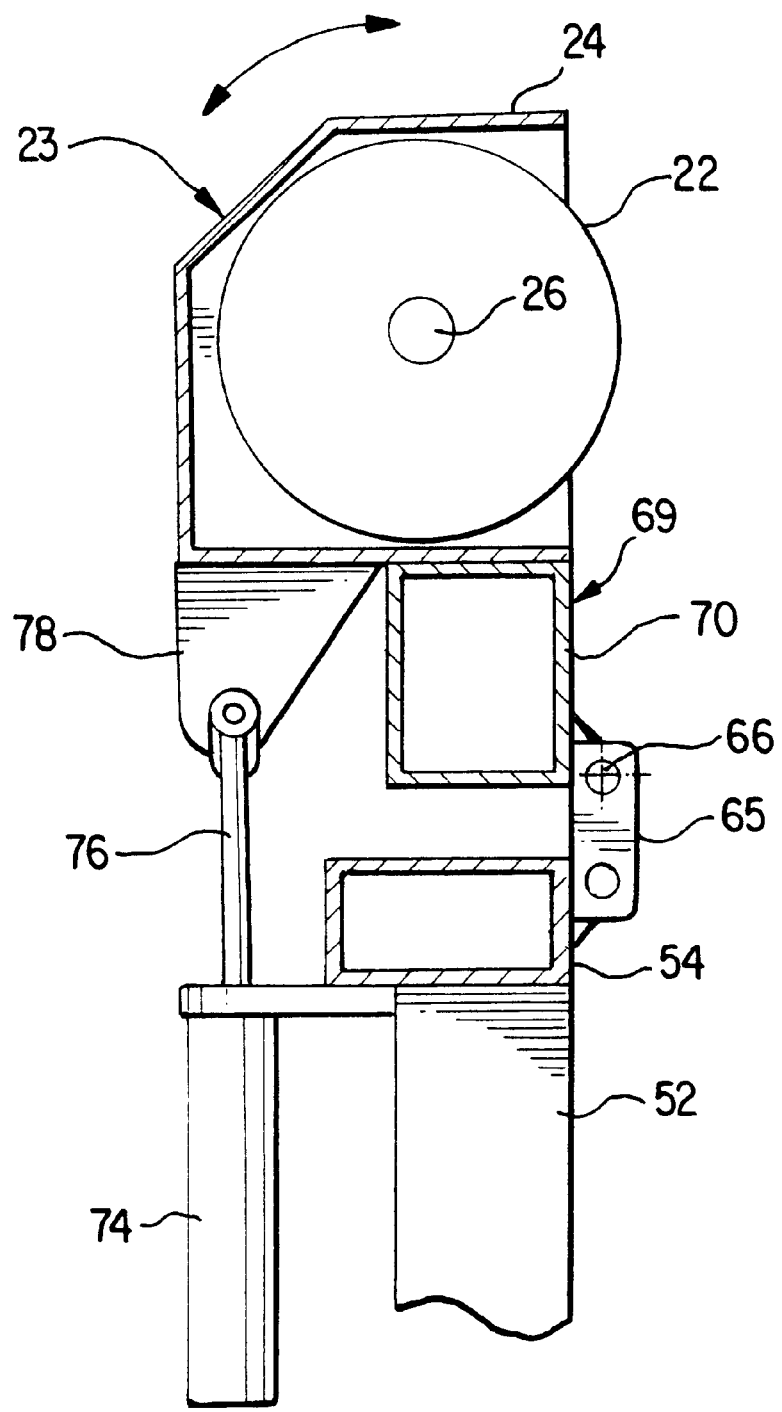
FIG. 2B is a schematic sectional view of taken along line 2B—2B in FIG. 2A.

In a preferred construction, tarp device 23 of generally conventional construction is mounted on a base frame 69 (see FIG. 2A). The base frame preferably includes a horizontal beam 70 and a pair of vertical plates 72. The base frame 69 is pivotally secured to the mount 54 of tower 20 via a hinge assembly 65. A pair of actuators 74 are preferably attached between tower 20 and brackets 78 on housing 24 (or base frame 69) to tilt the base frame 69 and housing 24 about the horizontal axis 66 defined by hinge assembly 65 (FIGS. 1, and 3B). The actuators 74 are preferably hydraulic cylinders, but could be formed as other drives, such as pneumatic cylinders or screw-operated devices. In a hydraulic construction, a self-contained hydraulic system (not shown) may be provided with the cover system 10, or the cylinders may be connected to the truck's hydraulic system. The forward ends 64 of lower arms 60 are preferably fixed to plates 72 by any known means such as bolting, welding, etc. As a result, the lower arms 60 pivot about the first pivot axis 66 with base frame 69 and tarp device 23.

With the above configuration, tarp device 23 and lower arms 60 rotate downwardly (clockwise as shown in FIG. 4A) about pivot axis 66 as the actuator rods 76 extend outward. According to one construction, the rotational angle α may range between about 45° to about 90° measured from the tower 20. Nonetheless, other ranges of motion are possible; for example, the rotational angle may go above the horizontal plane to about 110° or more from the tower, or extend downward at an angle of less than 45°. The operator is thus provided with improved control for placement of the tarp 22 on container 14 due to the pivoting of lower arms 60 and tarp device 23. Of course, other constructions involving the pivoting of the tarp device and lower arms could be used.

Moreover, the tarp device 23 could be fixedly secured to tower 20 and only the arms mounted for pivotal movement. For example, rotary or other actuators may be employed to rotate the lower arms 60, while the housing 24 remains stationary with respect to the rotation.

As noted above, covering system 10 further includes a pair of upper or rear arms 62 which are pivotally attached to the front or lower arms 60 (FIGS. 1 and 4A). In general, the rear arms 62 to pull and extend the tarp over the container. Each upper arm 62 includes a proximal or pivot end 80 and an opposed distal or free end 81. In a preferred construction, the pivot ends 80 of the upper arms 62 are pivotally attached to the rear ends 82 of the lower arms 60 by a pivot pin 84 to form a pivot axis 83 (see FIG. 1). In the most preferred construction, the pivot ends 80 are rotatably biased to rotate the upper arms 62 (clockwise shown as in FIG. 4A) toward the rear end of the truck. The rotational angle β of the upper arms 62 (as measured relative to the lower arms 60) preferably range from about 3° to about 176°. Nevertheless, other ranges of movement are possible with the arms 62.

Referring to FIG. 1, the free ends 81 of upper arms 62 include a transversely mounted cross member 88, such as a bar. The cross member 88 serves to extend the tarp as the upper arms 62 rotate towards the rear of the truck 14 or retract the tarp as the arms 62 rotate forwardly. The free or leading end of the tarp 22 may be attached to the cross member 88 in a number of ways. In one example, the cross member 88 is routed through a channel formed by overlapping portions of the leading end of the tarp being sewn together. Nevertheless, other arrangements to attach the tarp to the cross bar are possible. In addition, the tarp device 23 could be secured to upper arms 62 in place of the cross member and the free end of the tarp secured to tower 20.

In a preferred construction, upper arms 62 are biased toward the rear end of the truck 12 by coil springs 90 that are slidably disposed within the hollow interior of the lower arms 60. Nevertheless, springs 90 could be mounted along the side arms, or could have other constructions, e.g., torsion springs. The forward ends 92 of the springs 90 are securely attached to a support plate 94 at the forward ends 64 of lower arms 60. The rear ends 96 of the springs 90 freely move inside the lower arms 60 and are preferably attached to a flaccid line 98, such as cables, wire, wire rope, or the like, that is in turn attached to upper arm 62.

Figure 5A:
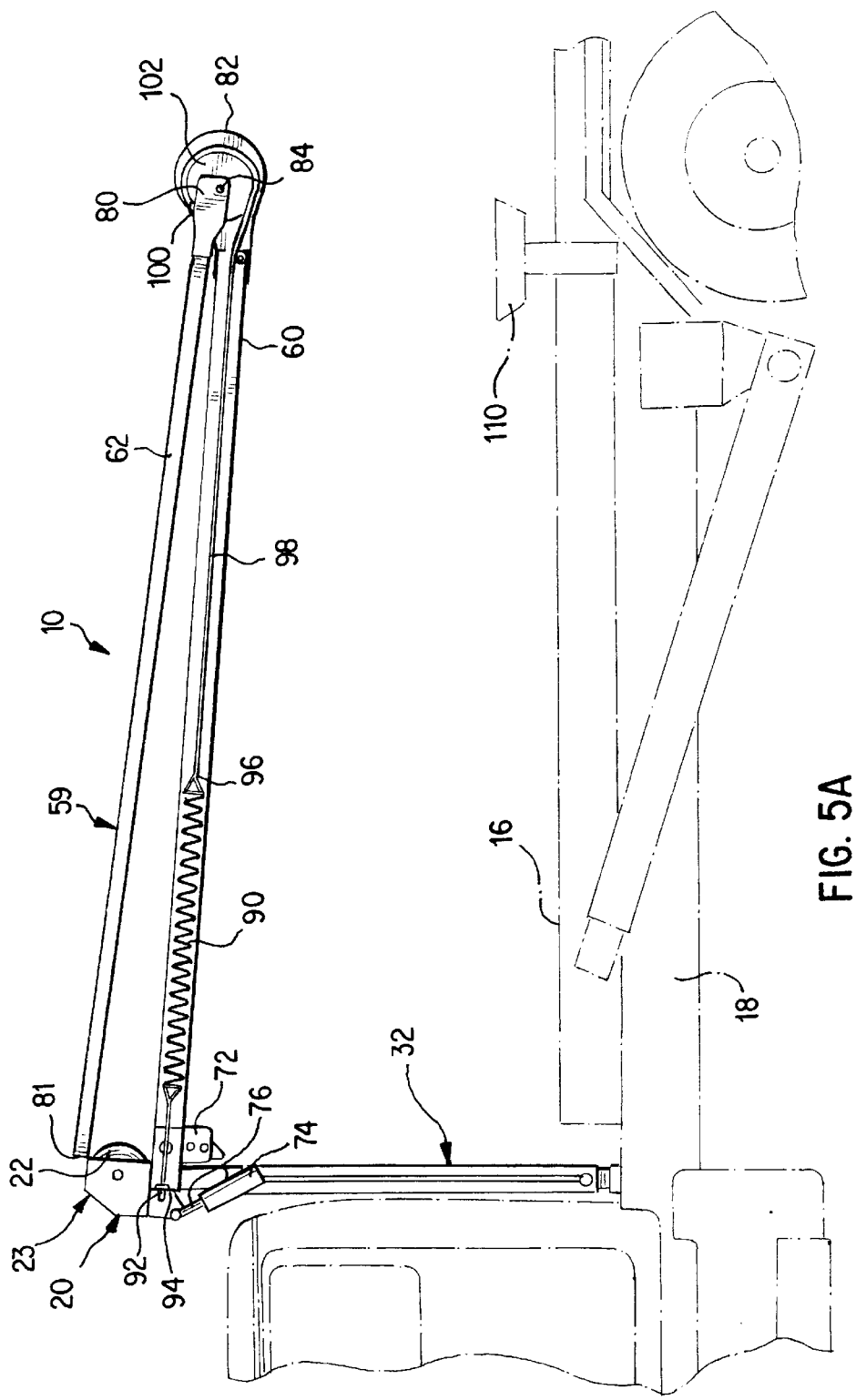
FIG. 5A is a first partial schematic side elevational view of the container covering system with a sidewall of a forward pivotal arm removed to reveal operative components therein.

In a most preferred construction, the pivot ends 80 of upper arms 62 are provided with pulley members 102 having peripheral grooves in which the cables 98 are disposed. The pulley members 102 are fixed the upper 62 and pivot about the pivot pin 84. The distal ends 100 of cables 98 are then wrapped about an arcuate surface of the pulley members and connected to an upper or mid portion of the pivot ends 80 of the upper arms 62 or distal end 100 could be routed through a hole in the pulley members 102 as seen in FIG. 5A. The springs 90 are sufficiently sized with an appropriate spring constant (e.g. stiffness rating) to overcome the gravitational weight of the upper arms 62 and cross member 80 so that they naturally pull cables 98 forward and swing the upper arms rearward. The movement of the tarp, however, is prevented by tarp device 23 until motor 28 is activated. Accordingly, the tarp 22 is maintained taut or under tension.

Figure 5B:
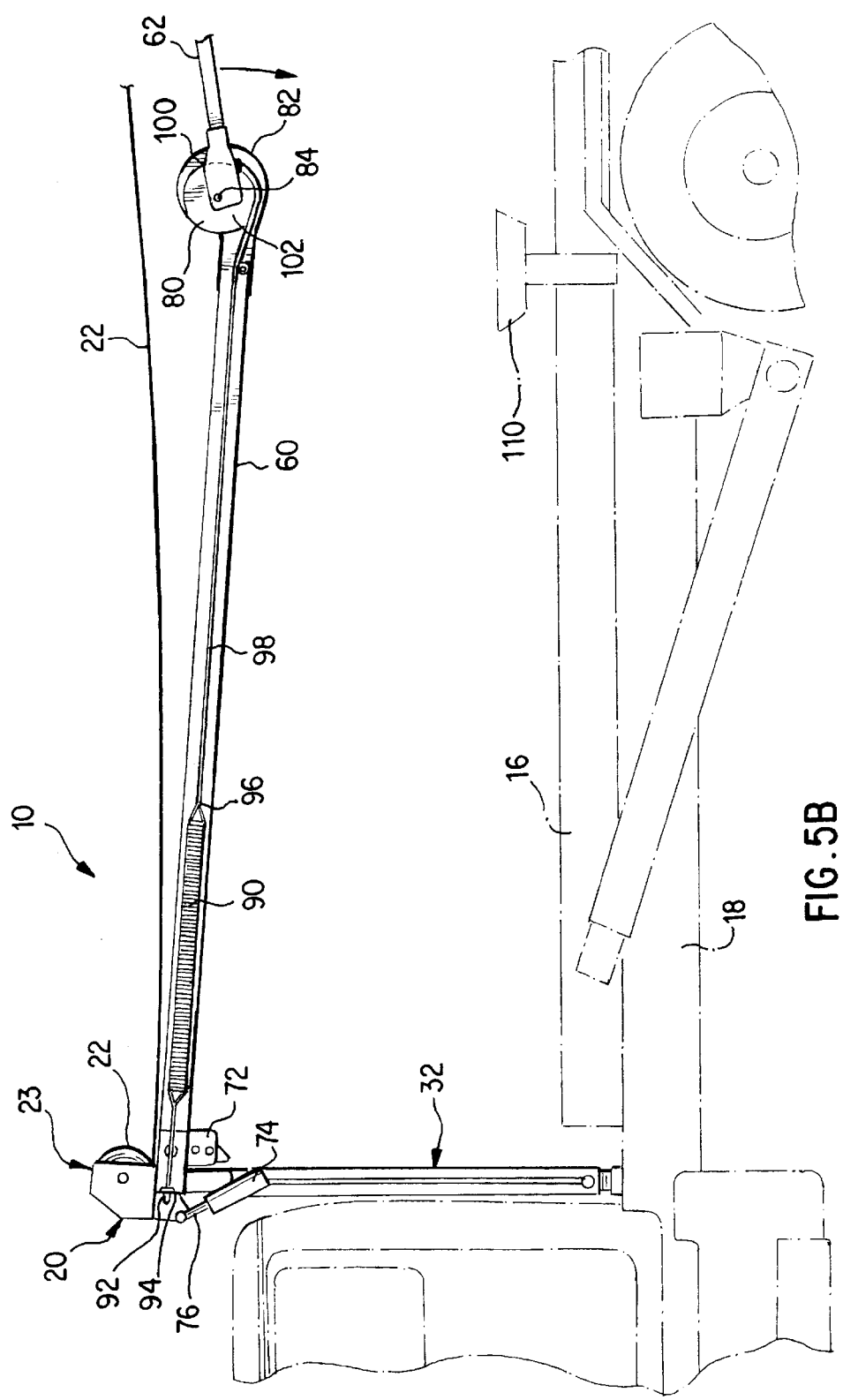
FIG. 5B is a second partial schematic side elevational view of the container covering system similar to FIG. 5A.

In a preferred construction, the tarp motor winds the tarp 22 on to the roller bar to retract the tarp to the stowed condition in the housing 24. During this retraction, the force created by the tarp motor overcomes the biasing force acting on the cables 98 provided by the springs 90. Likewise, to extend the tarp 22, the tarp motor 28 unwinds the tarp so that the leading edge of the tarp is pulled rearward by the tension created by the springs 90 acting on upper arms 62. During this extension action, the springs 90 shorten as they pull the cables forwardly as shown in FIG. 5B. By appropriately setting the torque rating of the tarp motor and the spring constant of springs 90, the tarp 22 can be extended and retracted by system 10 with great ease and smoothness. While a motor is preferably employed, it should be appreciated that other appropriate torque generating devices, such as a manual crank, can provide the needed movement of the tarp. Further, the tarp device 23 may be provided with a locking assembly to selectively lock the roller bar to hold the tarp in place and release the roller bar so as to pivot the rear arms to pull and extend the tarp over the container. Accordingly, the operator has forward and rearward control to easily position the leading end of the tarp for different lengths of open containers ranging from at least 10'–35' in length.

Arms 60, 62 can be made from a variety of materials and methods. In a preferred construction, arms 60, 62 are composed of a lightweight, durable material to reduce the developed stress on the arms, although it may be possible to use such material only for the upper arms. By employing a lightweight material for at least the upper arms 62, cyclic fatigue on the system 10 can be reduced thereby extending its operational life. Moreover, the overall size and ratings of the tubular springs 90 and the tarp motor can be reduced. Ease of installation and assembly of the system 10 on a truck is a further benefit, because less manpower and equipment are needed. The lightweight material preferably has a high strength to weight ratio. Accordingly, upper arms 62 may be formed with a plastic resin composite to a desired shape. The plastic resin composite may be an enhanced resin having a fibrous composition, that includes nylon, glass, graphite fibers or other. The arms may be formed by a process of pultrusion. Nevertheless, upper arms 62 can be formed of other appropriate lightweight materials, such as aluminum.

Figure 6A:
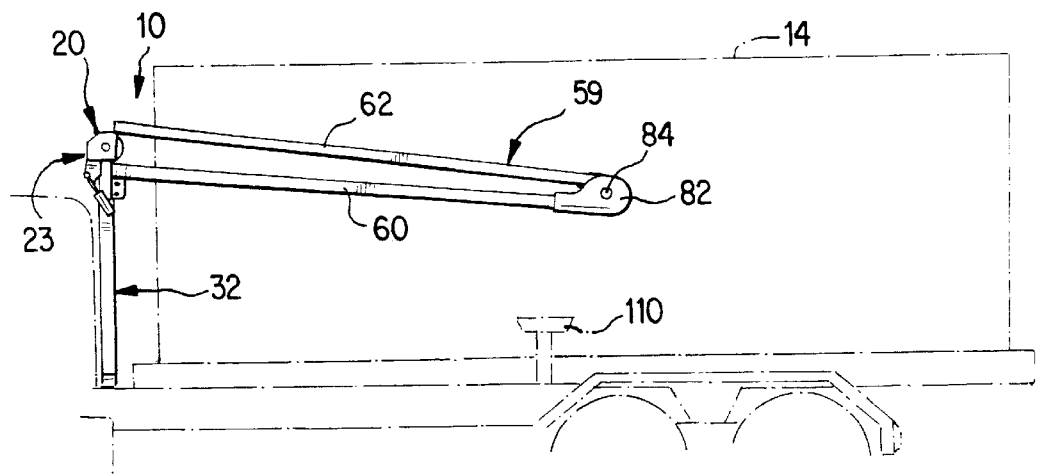
FIGS. 6A–6D are schematic side elevational views of an operational sequence of the container covering system.
Figure 6B:
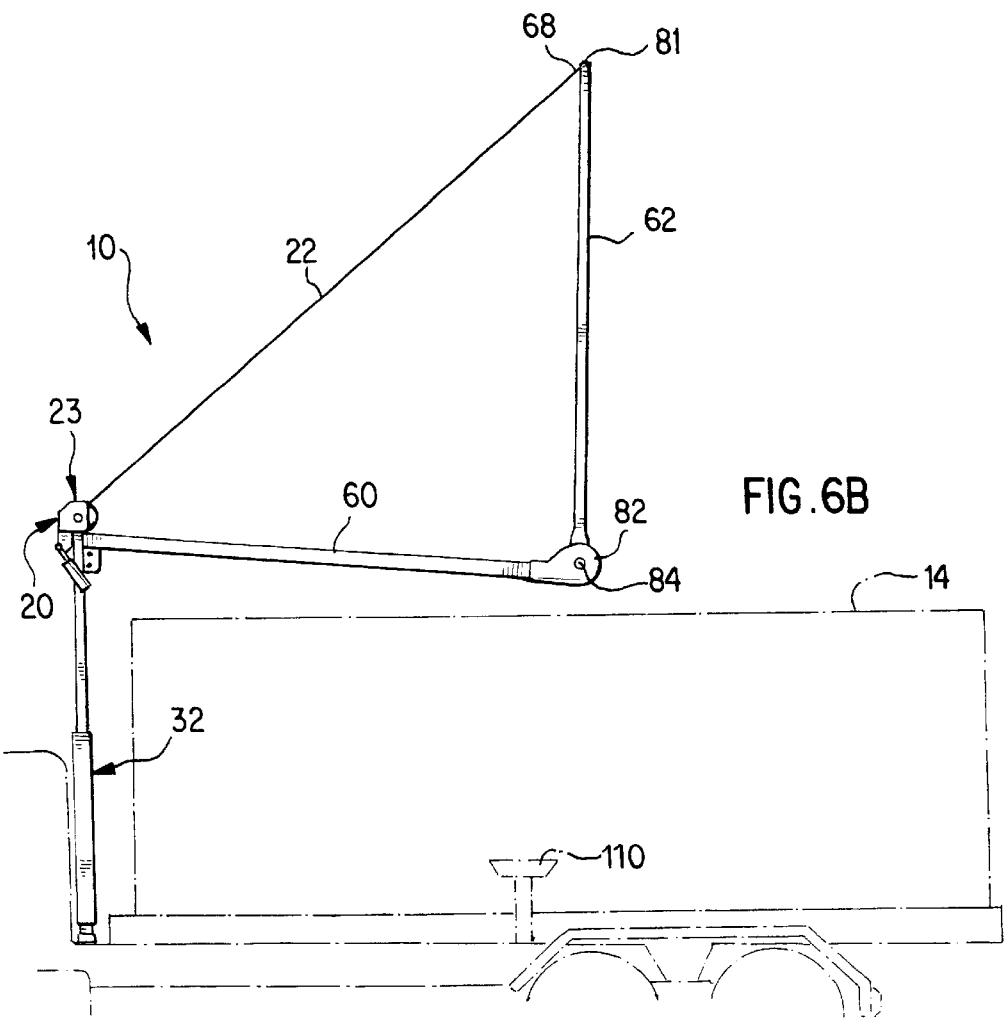
Figure 6C:
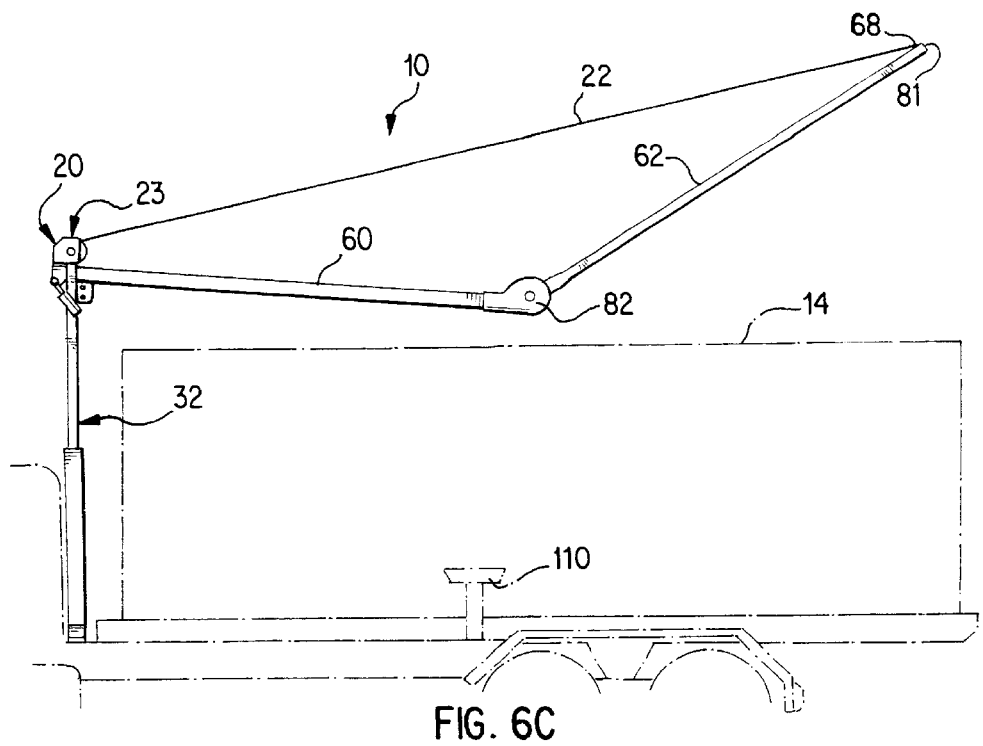
Figure 6D:
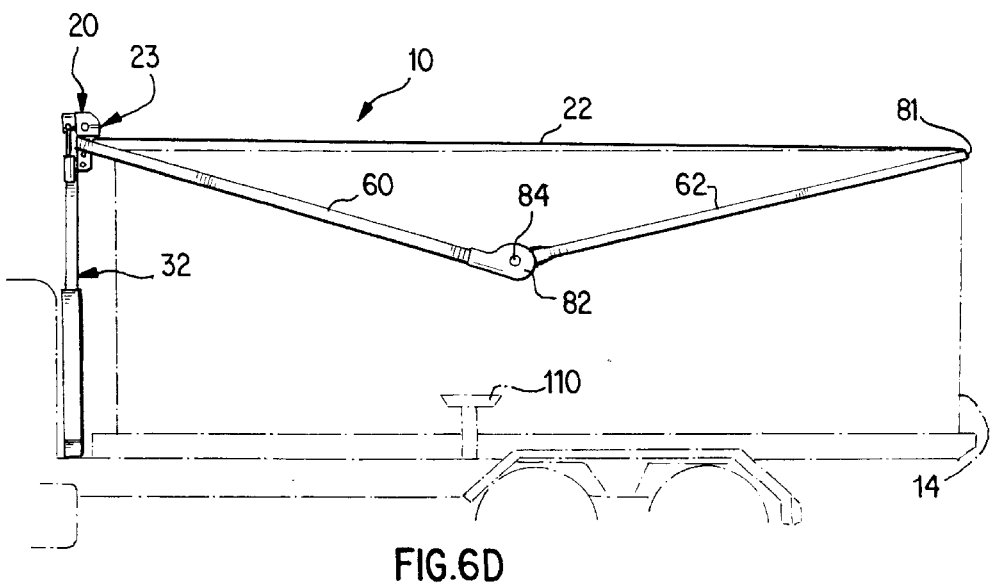

As shown in FIG. 4B, container covering system 10 is in a stowed position. Generally, in this stowed position, lower arms 60 are pivoted to a full downward position to rest on an optional holding device 110 mounted to the truck frame 12. The holding device 110 provides a resting location for the lower arms 60 and helps stabilize the arm assemblies 59 during transit when not covering a container. The holding device 100 can be mounted at other locations down the truck frame 12. In this stowed position, upper arms 62 are preferably fully collapsed towards lower arms 60, though this orientation is not necessary. Open top container 14 is positioned between the arm assemblies 59 in a conventional manner. The lower arms 60 are then pivoted to an appropriate horizontal position to permit the upper arms to high swing above the top of the container and its load (FIG. 6A). As needed, the operator activates the lifting device 32 to lift the housing 24 and corresponding arms 60, 62 above the container. After or during the setting of the tower and/or front arms, the operator operates the motor to unwind the tarp 22. The upper arms 62 under the bias of springs 90 pull the tarp rearwardly to cover the container 14 (FIGS. 6B and 6C). Once the tarp 22 is fully extended over the container, the tower is lowered so that the cover lies closely over the container (FIG. 6D). By controlling the angle α of the lower arms 60 and the angle β of the upper arms 62 (see FIG. 4B), the length and position of the tarp can be controlled. In the preferred operation, the leading end 68 og the tarp is placed on the top edge of the container to reduce the stress and wear on the tarp as opposed to lying over the rear edge of the container.

Figure 7:
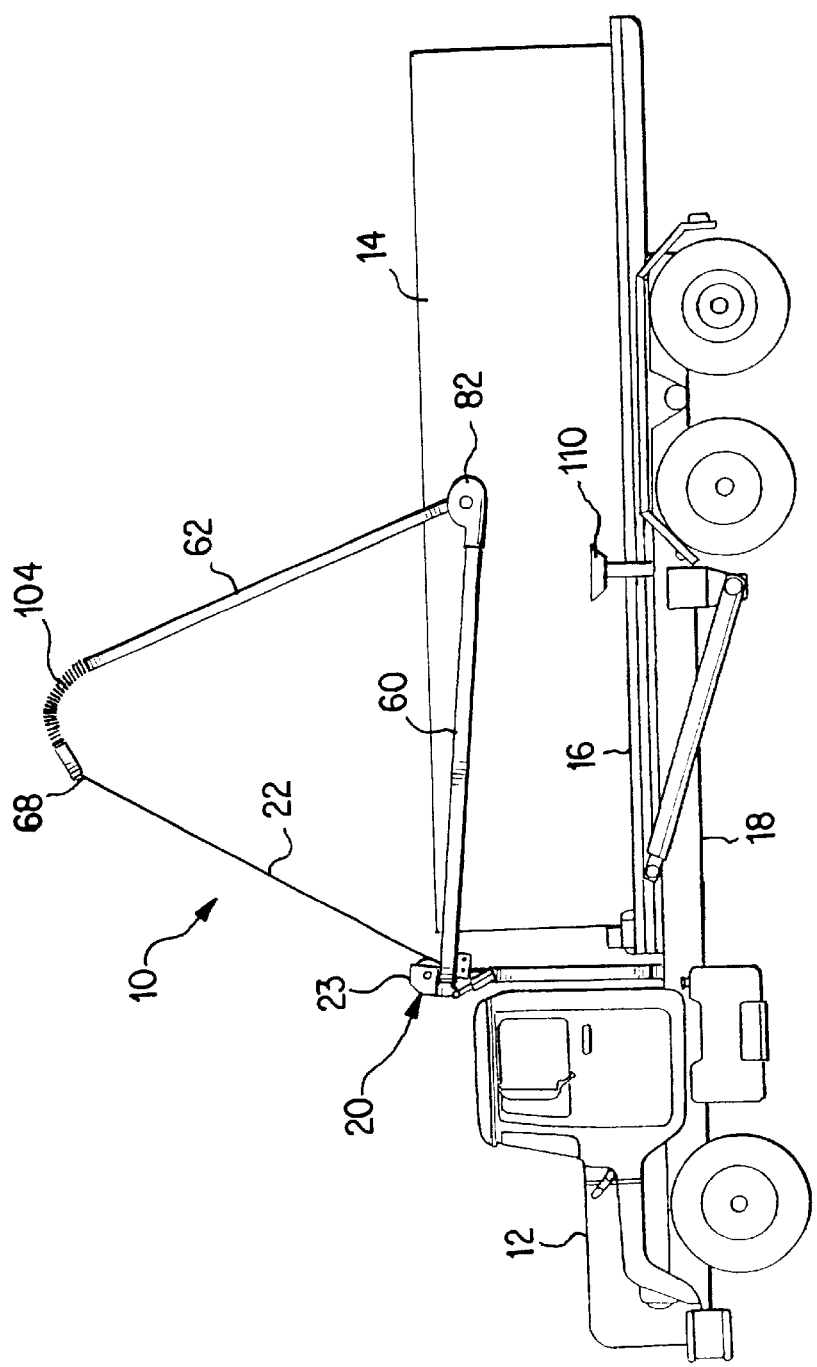
FIG. 7 is a schematic side elevational view of an alternative arrangement of the container covering system according to teaching of the present invention.
Figure 8:
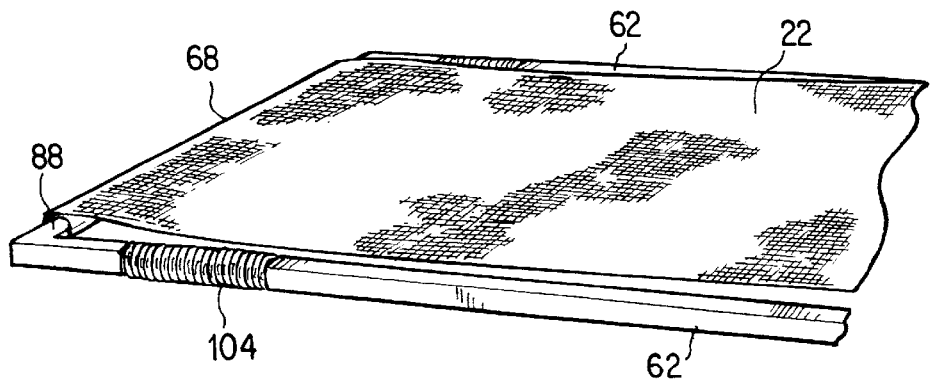
FIG. 8 is a first schematic perspective view of the free end of the alternative container covering system showing a flexible region in unrestrained state.
Figure 9:
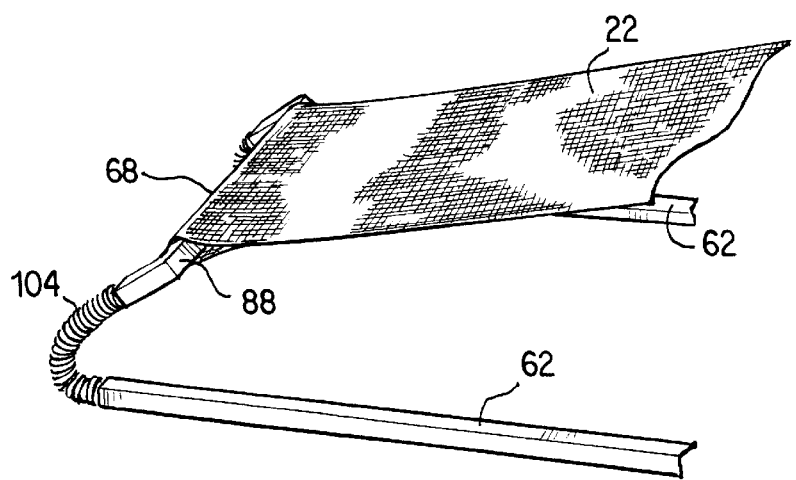
FIG. 9 is a second schematic perspective view of the free end of the alternative container covering system showing the flexible region in a restrained state.

Referring to FIGS. 7–9, the free ends 81 of the upper arms 62 may alternatively include flexible portions 104 that function as shock absorbers to thereby reduce stress in the arm assemblies and to fine-tune the position of the tarp leading end 68 on the open container. In a preferred construction, the flexible portion 104 may be formed by coil springs extending from the distal ends of upper arms 62. The at rest length (generally unrestrained) of the springs preferably ranges between one foot to two feet, although other lengths are possible. Cross member 88 may be routed through the tarp 22 as previously described and connected to the distal ends of arms by springs 104. In a preferred construction, the force of springs 90 is greater than the ability of springs 104 to resist lateral bending. As a result, springs 104 are bent with their distal ends pulled forward except when the arm assemblies are fully extended and additional tarp is played out by motor 28 (FIG. 8).

By adjusting the height of the tower and/or angle of arms 60, the tarp leading end 68 and cross member 88 can be forced against a rearwall of an open container to help stablize the arm assembly during transport. While not shown, the cross member can be placed over the rear end of the container. In this spring arrangement, springs 104 provide a shock absorbing function to reduce stress on the upper arms 62 which may be created by longitudinal and vertical movements of the container from the road during hauling operations. Moreover, springs 104 further reduce the stress in the arms and the risk of damaging system 10 in the event the cross member is engaged by the container or its contents.

In another aspect of the present invention, the holding device 110 may be vertically adjustable so that the lower arms 60 may rest when the arms are tilted from a stowage position shown in FIG. 4A. This construction can help stabilize the arm assembly during transit. In one construction, the holding device 110 can have vertical posts in a telescopic lifting system or be manually adjustable. Nevertheless, the vertical adjustability may be provided by hydraulic, pneumatic, or mechanical constructions, such as a gearing formation.

In another construction, aspects of container covering system 10 may be used with trucks that use dump trailers or tiltable dump containers. The tarp device 23 may be mounted generally at top edge of the container body. Front arms 60 may be secured to a front portion of the container body. Arms 60 are preferably attached for pivotal movement, although they could be fixably attached, if some reduced adjustability is deemed acceptable for the intended use. In the preferred construction, the front arms 60 may be pivotally secured at their front ends to the tarp device 23 or near the top edge on the lateral sides of the container body. The upper or rear arms 62 are pivotally secured at their proximal ends to the rear ends of the front arms. The distal ends of the rear arms 62 are preferably connected to each other via the cross member 88.

While FIG. 2A illustrates one mounting arrangement of tarp device 23, it is possible to mount the tarp device 23 to the container body, in lieu of the lifting device 32. In this construction the base frame 69 may be hingely connected by the hinge assembly 65 to the top edge of the container body instead of mount 54. In this construction, the arms 60, 62 provide the same adjustability as previously described, except that a tower 20 is not used. The rear arms 62 biased toward the rear end of the container body. Accordingly, the aspects of system 10 provide improved control of covering and uncovering loads and avoids the problems of high maintenance found in past covering systems, in particular with dump bodies.

FIGS. 10A–11 illustrate an alternative container covering system 200 according to the present invention. In a preferred construction, container covering system 200 includes a pair of lower arms 260 which are secured to a mounting frame 202, and a pair of upper arms 262 which are pivotable with respect to the lower arms 260. The lower arms 260 are preferably mounted for pivotal movements, although they could be fixed if reduced adjustably is deemed acceptable for the intended use. The mounting frame 202 is preferably located on a forward portion of the truck bed, behind the truck cab vehicle and affixed to the truck frame 18, receiving frame 16 or other parts of the vehicle. The mounting frame 202 preferably has a low height profile which reduces possible damage from irregular shaped containers. In one case, the height as measured from the truck frame 18 may range between 0.50 foot to 3 feet. Nevertheless, height could have other values. In addition, the low height of mounting frame 202 eliminates obstructions in the rear window of the truck cab when a container is not on the truck and improves the operator's visibility for driving the truck. Further, the gantry or tower is eliminated in this construction, although it could be used if desired. Container covering system 200 preferably lightweight materials which eases installation and reduces stress on the arms 260, 262.

Referring to FIG. 11, mounting frame 202 preferably includes a generally "C" shape support member 206 mounted to a post 204. Support member 206 includes a pivot assembly 266 defining a transverse axis about which the lower arms 260 rotate. To provide rotational movement of lower arms 260, actuators 274, preferably in the form of hydraulic cylinders, are attached between support members 206 and arms 260. Actuator rods 276 of cylinders 274 are pivotally mounted to the proximal ends 264 of lower arms 260. Accordingly, as the actuator rods 276 extend outward, the lower arms 260 rotate upwardly (counter-clockwise as shown in FIG. 10B) about a pivot axis defined by pivot assembly 266. Arms 260 then rotate downwardly (clockwise as shown in FIG. 10B) as rods 276 retract inward. According to one construction, the rotational angle α may range between 0° to 50° as measured from a horizontal plane. Nevertheless, other range of motion arms for the rotational angle are possible. Arms 260 may include a fitting device 261 with attaches over the proximal ends 264. The fitting device 261 may include a stop bar 263 which cooperates with a lower stop 265 mounted on the "C" shaped member 206. This stop arrangement can provide a way to prevent over downward rotation of the arms 260 during such operations as assembling of the actuators to the member 206 and arms 260.

It should be understood that the actuators may have other constructions and that the support arrangements may be structured differently. As an example, the actuator may attach to an arm extension that is forward of the pivot axis so that retraction of rods 276 causes the arms 260 to be raised. As another example, the ends of rods 276 may be provided with a rack that engages a gear formation on the ends of arms 260 to move the arms, in a manner similar to that shown in FIG. 5 of U.S. Pat. No. 5,829,818, which is hereby incorporated by reference. In this alternative construction, the actuators may be oriented vertically or horizontally.

Figure 10C:
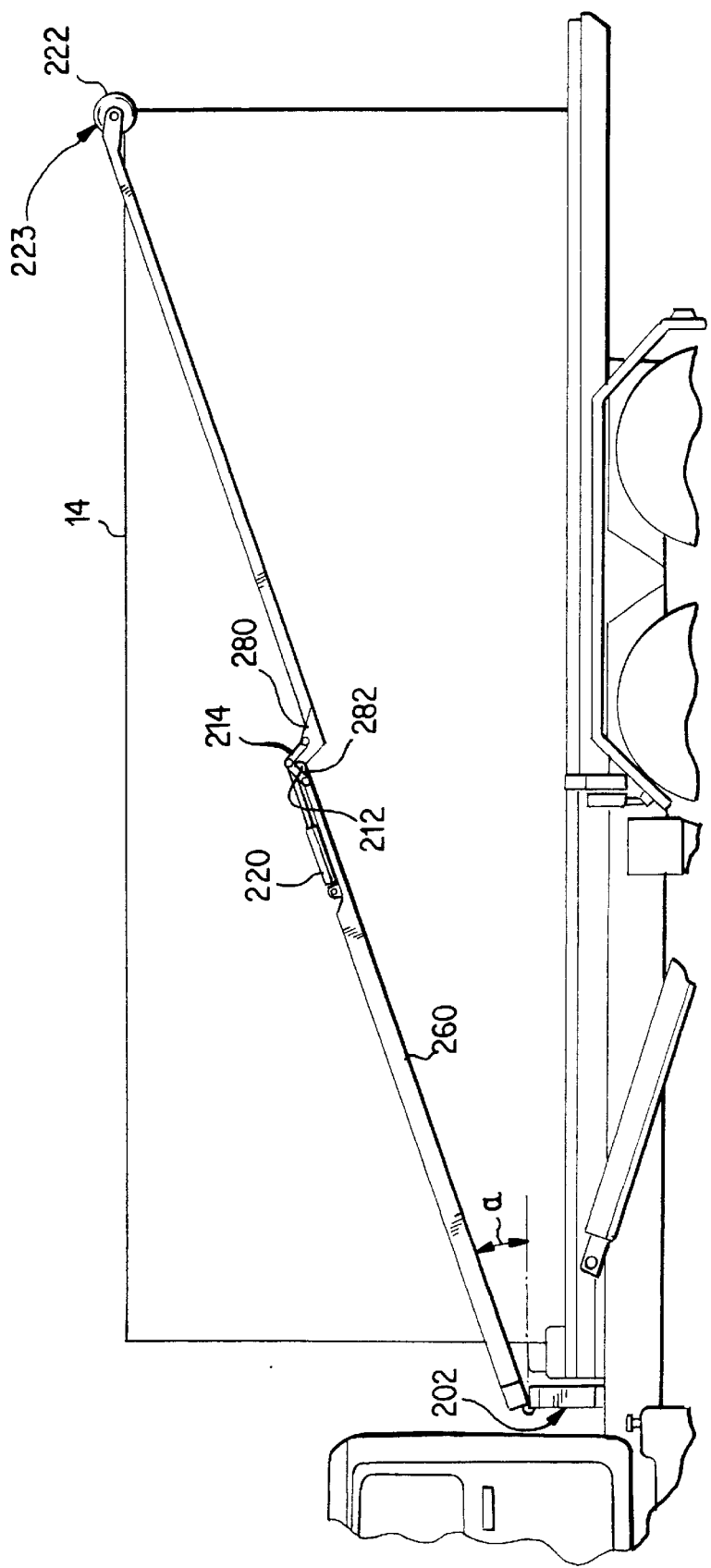
FIG. 10C is a schematic side elevational view of an alternative embodiment of a container covering system according to teaching of the present invention in one extended operational position.

Similarly, as with container covering system 10, upper arms 262 may be cantilevered in an extended position with respect to lower arms 260. In a preferred construction, the pivot ends 280 of the upper arms 262 are pivotally attached to the distal ends 282, of the lower arms 260 by a pivot pin 212 to form a pivot axis, although other arrangements are possible. In the most preferred construction, actuators 220, preferably in the form of hydraulic cylinders are provided to rotate upper arm 262. The cylinders 220 are preferably mounted in a notched region of the lower arms 260 on the topside near the rear end 282 although other arrangements are possible. As shown in FIGS. 10A–10C, the notched region lowers the side profile of the cylinders so as to form a more compact structure when the arms are stowed. The rods of actuators 220 are preferably attached to a linkage assembly 214 to enable full extension of arms 262. In use, the upper arms 262 rotate toward the rear of the truck when the rods extend. Likewise, the arms 262 rotate towards the front of the truck when the rods retract. Nevertheless, other constructions could be used to pivot the upper arms 262. Further, the cylinders 274 may be hydraulic with a self-contained system (not shown) or run off the truck's hydraulic system.

To provide a better understanding of the operation of the container covering system 200, FIGS. 10A–10C illustrate an exemplary operational sequence of a method of covering an open container in accordance with the present invention. As shown in FIG. 10A, container covering system 200 is in a stowed position. Generally, in this position, lower arms 260 are pivoted to a full downward position. Upper arms 262 are generally fully pivoted towards the lower arms 260, but the full pivot is not required. Open top container 14 is positioned between the lower arms 260 and the upper arms 262. As shown in FIG. 10B, when lower arms 260 are fully rotated upward, the upper arms 260 high into the air and far above the container and its contents. Advantageously, the tarp is able to clear nearly all heaped or protruding loads of any of the containers in common use, i.e., containers with 4, 6 or 8 foot high sidewalls. In FIG. 10C, the tarp 222 is advantageously positioned on the top of the container in which the leading end is located at the rear end of the container.

In this construction, the tarp device 223, does not use a motor to play out the tarp. Rather, as is known, a tension can be maintained on the extended tarp with the use of a spring mechanism (not shown) in the tarp device. Further, the tarp device 223 may be mounted on the frame 202 or between the distal ends of upper arms 262. Moreover, a flexible portion (not shown) similar to springs 104 could be used to provide a shock absorbing function. Further, a holding device (not shown) similar to the holding device 110 may be included.

While the present invention has been described with reference to preferred embodiments, it will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the appended claims.

We claim:

1. A covering system for covering an open container on a truck bed of a truck, comprising:

a tarp device having a tarp movable between an extended position to cover a container and a retracted position wherein the tarp is substantially stowed;

a pair of arm assemblies configured to receive the container therebetween, each pair of arm assemblies including a first and second arm each having a proximal end and a distal end, the proximal end of the first arms being secured to the truck at a front end of the truck bed, and the proximal end of the second arms being pivotally secured to the distal end of the first arms, the distal end of the second arms being operably coupled to the tarp; and at least one actuator to swing at least the second arms rearward to move the tarp from the retracted position to the extended position.

2. The system in accordance with claim 1, in which the proximal ends of the first arms are pivotally secured at the front end of the truck bed, and a second actuator is provided to adjust the position of the first arms.

3. The system in accordance with claim 2, in which the at least one actuator further includes at least one biasing member coupled to the second arms to bias so as to pivot the second arms toward the extended position.

4. The system in accordance with claim 3, in which the at least one biasing member includes a spring for biasing each of the second arms.

5. The system in accordance with claim 4, in which each spring is disposed inside one of the first arms.

6. The system in accordance with claim 4, further including an arcuate member which is operatively attached to each spring so at to pivot the second arms.

7. The system in accordance with claim 6, in which the arcuate member is included is a pulley attached to the proximal end of the second arms.

8. The system in accordance with claim 4, in which the spring is a torsion spring.

9. The system in accordance with claim 2, further including a lifting device which can lift the tarp device to a position above the open top of the container and lower the tarp device to another position below the open top of the container.

10. The system in accordance with claim 1, in which the second arms have at least a portion composed of a lightweight material.

11. The system in accordance with claim 10, in which the lightweight material further comprises a composite material.

12. The system in accordance with claim 11, in which the composite material includes a plastic resin and contains fibers therein.

13. The system in accordance with claim 10, in which the lightweight material is aluminum.

14. The system in accordance with claim 3, wherein the tarp device further includes a roller bar about which the tarp is wound thereabout and a motor configured to turn the roller bar to wind and unwind the tarp.

15. The system in accordance with claim 1, in which the front of the truck includes a tower that the proximal ends of the front arms are secured thereto and the tarp device is mounted on the tower.

16. The system in accordance with claim 15, in which the proximal ends of the first arms are pivotally secured to the tower.

17. The system in accordance with claim 16, in which the at least one actuator further includes at least one biasing member coupled to the second arms to bias so as to pivot the second arms toward the extended position.

18. The system in accordance with claim 17, in which the tower further includes a lifting device configured to lift the tarp device and the arm assemblies to a position above the open top of the container and to another position below the open top of the container.

19. The system in accordance with claim 1, in which the first arms can rotate up to about to 45 degrees from a horizontal plane located at 0 degrees.

20. The system in accordance with claim 1, in which the second arms have a rotational range of about 3 degrees to 176 degrees with respect to a first axis extending through the distal ends of the first arms.

21. The system in accordance with claim 1, in which the distal ends of the second arms have a flexible portion disposed along a predefined length so as to move the leading end of the tarp to the extended position.

22. The system in accordance with claim 14, in which the tarp is held in place when the motor is at rest.

23. The system in accordance with claim 1, in which the at least one actuator is selected from a group comprising a hydraulic actuator, a pneumatic actuator, and a screw drive.

24. The system in accordance with claim 1, in which the at least one actuator is biased to pivot the second arms towards the extended position.

25. The system in accordance with claim 24, in which the at least one actuator is disposed inside one of the first arms.

26. The system in accordance with claim 1, further including a pair of vertically adjustable devices mounted to the truck so as to hold the arm assemblies when the tarp is in the extended position.

27. The system in accordance with claim 1, in which the arm assemblies are constructed from a lightweight metal.

28. The system in accordance with claim 1, in which the proximal ends of the first arms are pivotally secured to a mount included on the truck bed, and a second actuator is provided to adjust the position of the first arms.

29. The system in accordance with claim 28, in which the at least one actuator is attached to one of the first arms.

30. The system in accordance with claim 29, further including a linkage assembly pivotally attached to the first arms and the second arms.

31. A covering system for covering an open top container body on a truck bed of a truck, comprising:

a tarp device having a tarp movable between an extended position to cover a container body and a retracted position wherein the tarp is substantially stowed;

a pair of arm assemblies configured to have the container body therebetween, each pair of arm assemblies including a first and second arm each having a proximal end and a distal end, the proximal end of the first arms being secured to the container body at a front end of the truck bed, and the proximal end of the second arms being pivotally secured to the distal end of the first arms, the distal end of the second arms being operably coupled to the tarp; and at least one actuator to swing at least the second arms rearward to move the tarp from the retracted position to the extended position.

32. The system in accordance with claim 31, in which the proximal ends of the first arms are pivotally secured at the front end of the container body, and a second actuator is provided to adjust the position of the first arms.

33. The system in accordance with claim 32, in which the at least one actuator further includes at least one biasing member coupled to the second arms to bias so as to pivot the second arms toward the extended position.

34. The system in accordance with claim 33, in which the at least one biasing member includes a spring for biasing each of the second arms.

35. The system in accordance with claim 34, in which each spring is disposed inside of the first arms.

36. The system in accordance with claim 34, further including a pulley attached to the proximal end of the second arms.

37. The system in accordance with claim 34, in which the spring is a torsion spring.

* * * * *

UNITED STATES PATENT AND TRADEMARK OFFICE
CERTIFICATE OF CORRECTION

PATENT NO. : 6,695,382 B2  Page 1 of 1
APPLICATION NO. : 10/120841
DATED : February 24, 2004
INVENTOR(S) : Ciferri et al.

It is certified that error appears in the above-identified patent and that said Letters Patent is hereby corrected as shown below:

In the drawings, after Sheet 15:
    Please insert the figure below

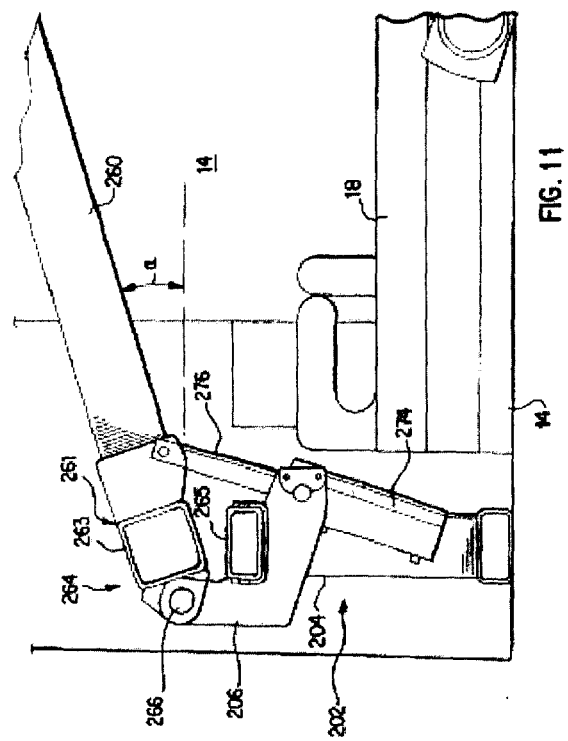

Signed and Sealed this

Seventeenth Day of October, 2006

JON W. DUDAS
*Director of the United States Patent and Trademark Office*